United States Patent [19]

Honma

[11] Patent Number: 4,556,537

[45] Date of Patent: Dec. 3, 1985

[54] REACTOR

[75] Inventor: Junji Honma, Tokyo, Japan

[73] Assignee: Idemitsu Kosan Company Limited, Japan

[21] Appl. No.: 540,670

[22] Filed: Oct. 11, 1983

[30] Foreign Application Priority Data

Oct. 15, 1982 [JP] Japan .............................. 57-180943
Oct. 21, 1982 [JP] Japan .............................. 57-183748

[51] Int. Cl.⁴ .............................................. B01J 8/06
[52] U.S. Cl. ..................................... 422/49; 422/130; 422/219; 422/312
[58] Field of Search ............... 422/129, 130, 312, 186, 422/49, 211, 219

[56] References Cited

U.S. PATENT DOCUMENTS

| | | | |
|---|---|---|---|
| 1,159,865 | 11/1915 | Pier | 422/312 |
| 3,332,870 | 7/1967 | Orbach et al. | 422/186 |
| 3,585,007 | 9/1968 | Gross | 422/130 |
| 3,668,108 | 6/1972 | Houseman | 422/186.22 |
| 3,933,434 | 1/1976 | Matovich | 422/186 |
| 4,011,165 | 3/1977 | Filippov et al. | 422/186.19 |
| 4,179,616 | 12/1979 | Coviello et al. | 422/186 |

Primary Examiner—Barry S. Richman
Assistant Examiner—Titus B. Ledbetter, Jr.
Attorney, Agent, or Firm—McGlew and Tuttle

[57] ABSTRACT

A reactor, comprising an inner reaction tube, a head part having an inlet for feed, and an outer cylindrical part having a space to accommodate therein the inner reaction tube and an outlet for product, wherein the head part is connected to the outer cylindrical part and the inner reaction tube placed in the space of the outer cylindrical part is also connected to the head part and/or the outer cylindrical part. This reactor can be easily assembled or disassembled; that is, a catalyst placed in the inner reaction tube can be exchanged only by dismantling one of the head part and the outer cylindrical part. Thus the reactor of the invention is suitable for use in chemical experiments.

4 Claims, 6 Drawing Figures

CATALYST

4,556,537

REACTOR

FIELD OF THE INVENTION

The present invention relates to a reactor suitable for use in chemical experiments, for example.

BACKGROUND OF THE INVENTION

Conventional reactors used in chemical experiments comprise a metallic tube made of, e.g., stainless steel, and franges or cap nuts provided to both ends of the metallic tube by means of screws or by welding so that a given catalyst can be introduced into or withdrawn from the metallic tube, and a feed inlet and a product outlet are provided thereto (see FIGS. 3 and 4).

In chemical experiments, it is necessary for the catalyst to be exchanged for each experiment. For this reason, the reactor should be disassembled or its upper and lower parts should be dismantled for each experiment. Moreover, when a short reaction tube is used, a fixing portion of a wrench cannot be provided in the vicinity of the frange in view of the necessity of heat insulation and, therefore, it is necessary for nuts to be fitted to or removed from the upper and lower parts of the reactor. This will give rise to various problems; for example, frange nuts fracture when they are fitted and removed several times and the reaction tube is twisted. Thus no suitable reactor for chemical experiments has been available.

SUMMARY OF THE INVENTION

An object of the present invention is to provide a reactor which can be easily assembled or disassembled and moreover in which a catalyst can be easily charged to or removed from the interior thereof.

It has been found that the object can be attained by providing a vessel to accomodate therein a reaction tube, said vessel being separated into a head portion and an outer portion which can be easily fitted together or dismantled by means of, e.g., a cap nut and a frange.

The present invention relates to a reactor comprising:
an inner reaction tube;
a head part having an inlet for feed, a connecting portion where the head part is connected to the inner reaction tube, and a connecting portion where the head part is connected to an outer cylindrical part;
an outer cylindrical part having a connecting portion where the outer cylindrical part is connected to the head part, a space to accomodate therein the inner reaction tube, and a product outlet;
wherein the head part is connected to the outer cylindrical part and the inner reaction tube placed in the space of the outer cylindrical part is also connected to the head part and/or the outer cylindrical part.

DETAILED DESCRIPTION OF THE INVENTION

Figure 1:
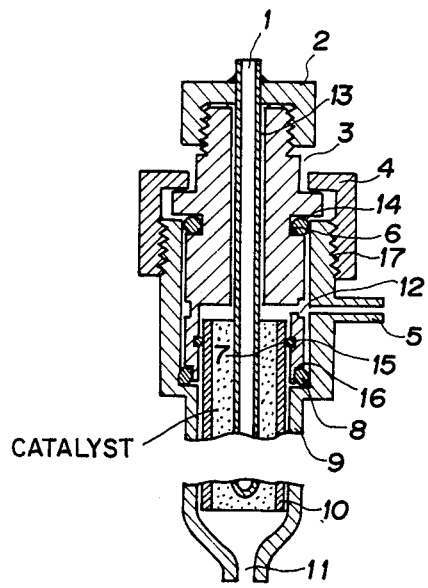
FIG. 1 is a cross sectional view of a reactor of the invention.

The head part of the reactor of the invention has an inlet for feed, a connecting portion where the head part is connected to the inner reaction tube, and a connecting portion where the head part is connected to the outer cylindrical part. The inlet for feed may be connected directly or through the outer cylindrical part to the outside.

When a feed is introduced in the inner reaction tube through the outer cylindrical part, it is necessary to provide such a means to prevent the short path of the feed. On the other hand, the connection between the head part and the inner reaction tube is sufficient to be of the extent that the feed is prevented from leaking. When the inner reaction tube is fixed and sealed by means of the outer cylindrical part, it is not necessary to connect the inner reaction tube to the head part. In the connection between the head part and the inner reaction tube, the connection can be applied by any suitable means capable of withstanding a pressure difference due to the pressure loss through a catalyst layer in the inner reaction tube; in other words, by those means capable of withstanding several atmospheres of pressure, such as an o-ring of butyl rubber, etc.

The inner reaction tube can be connected to the head part by means in which a hole is bored in one end of the head part and the inner reaction part is inserted into the hole, or means in which one end of the head part is made smaller than the diameter of the inner reaction tube and the inner reaction tube is fitted to the smaller end portion. Furthermore the head part and the inner reaction tube can be combined together by welding. If desired, the head part can be provided with a thermowell through which a heat-sensitive element, such as a thermocouple, is passed to the reaction zone.

The outer cylindrical part has a connecting portion where the outer cylindrical part is connected to the head part, a space to accomodate therein the inner reaction tube, and an outlet for product. The outer cylindrical part can be connected to the head part by any means so long as it can withstand the reaction pressure. Suitable examples of such means include a cap nut, a frange, and a Swagelok connector (Swagelok is a trade name for a connector manufactured by the Crawford Fitting Company). Various packings can be used to make the connection pressuretight. Preferred examples of the packing are a metal packing and an o-ring.

The inner reaction tube is of such size that can be accomodated in the space of the outer cylindrical part and is in the form of a cylinder opened at both ends, one of said ends being connected to the head part and/or the outer cylindrical part. The term "cylinder" or "cylinder form" as used herein includes a polygonal form, such as tetragonal and hexagonal forms, as well as the regular cylindrical form. Moreover, the cross section of the inner reaction tube need not be of the same from one end to the other end; for example, one end is larger in size than the other end, or the middle part is larger or smaller in size than the ends.

The material of which the reactor of the invention is made can be selected or determined appropriately taking into account the purpose for which the reactor is used, particularly conditions such as temperature and pressure under which the reaction apparatus is used.

The reactor of the invention will hereinafter be explained in detail with reference to the accompanying drawings.

Figure 3:
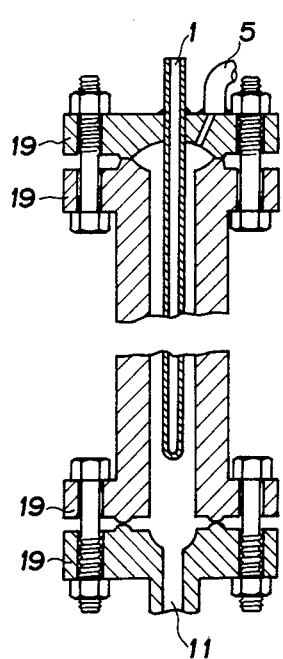
FIGS. 3 and 4 are cross sectional views of conventional reactors.
Figure 4:
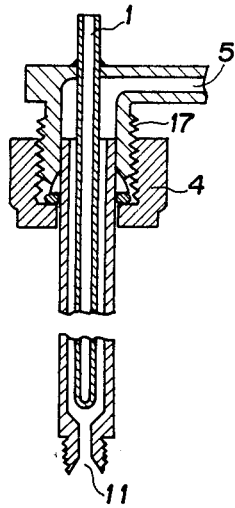

Referring to FIG. 1, there is shown a reactor of the invention, comprising a head part 3 having an inlet for feed introduction and a groove 14 for packing, and an outer cylindrical part 9 having a side inlet for feed introduction 5, a screw or thread 17 for a cap nut, and an outlet for product 11. The head part 3 is fitted demountably to the outer cylindrical part 9 to form a vessel containing therein an inner reaction tube 10. The head part 3 and the outer cylindrical part 9 are secured to each other by connecting a cap nut 4 to the screw 17 of the outer cylindrical part 9. In the figure, the reference numeral 1 indicates a thermowell; 2, a cap nut; 12, an inlet for feed introduction; 13, an opening through which the thermowell is fitted; and 19, a flange (FIG. 3).

In exchanging the catalyst packed in the inner reaction tube 10 of the reactor of the invention, the cap nut 4 is first turned to remove the head part 3 from the outer cylindrical part 9. The connection between the head part 3 and the outer cylindrical part 9 is made pressure-tight by a packing 6 placed in the groove 14 which is formed in the head part 3. Hence the cap nut 4 can be easily turned by hand without the use of, e.g., a wrench and the head part 3 can be easily dismantled. If the inner reaction tube 10 is secured to the head part 3 by means of a packing 7 placed in a groove 15, when the head part 3 is dismantled, the inner reaction tube 10 is removed along with the head part 3. The used catalyst is withdrawn from the inner reaction tube 10 at the side that is not connected to the head part 3 and a fresh catalyst is introduced thereinto. Then the inner reaction tube 10 is fitted through the outer cylindrical part 9 in the state that the packing 6 is placed in the groove 14 and furthermore, if necessary, a packing 8 is placed in a groove 16. After securing the inner reaction tube 10 by means of the cap nut 4, a new experiment is ready to commence.

When it is desired also to remove the inner reaction tube 10 from the head part 3 in the above-described operation, it is sufficient to remove the inner reaction tube 10 while turning it, that is, its removal can be attained by a simplified procedure.

In packing the inner reaction tube 10 with a catalyst, glass wool or glass beads are placed in the inner reaction tube 10, the predetermined amount of the catalyst is introduced, and then glass wool or glass beads are placed in position. Thus the catalyst is held in the interior of the inner reaction tube 10 in a stable condition and is prevented from flowing out of the inner reaction tube 10.

Figure 2:
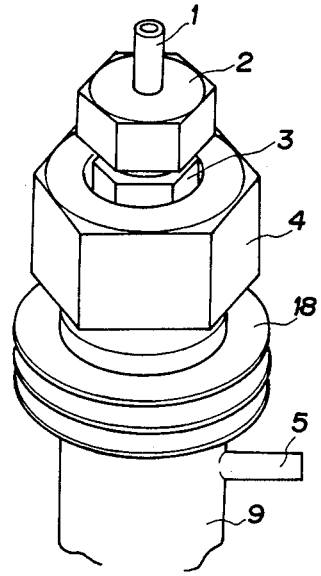
FIG. 2 is a perspective view of a reactor of the invention.

In the reactor of the invention, as described above, the exchange of the catalyst can be performed by removing one side portion unlike the conventional reactor in which it is necessary to remove both the upper and lower portions. For example, when the lower portion of the outer cylindrical part 9 (e.g. at outlet 11) is secured to another reactor or a heater and even if the inlet 5 is also secured, it is possible to remove the inner reaction tube 10 for the catalyst exchange in the original state that the outer cylindrical part 9 is secured thereto. Moreover, nichrome wires for a heater can be wound directly on the outer cylindrical part 9, or a heat radiation fin 18 can be provided as shown in FIG. 2. This greatly facilitates the control of the temperature distribution in the reaction zone.

Moreover the reactor of the invention is of two layer structure comprising the outer cylindrical part 9, the head part 3 and the inner reaction tube 10, and the inner reaction tube 10 is shielded from external pressure by means of the packing, such as an o-ring. Thus, pressure is less exerted on the inner reaction tube 10, and the inner reaction tube 10 can be made of material having a low pressure-resistant strength, such as glass.

The reactor of the invention can be used as a high-pressure reactor which can be easily assembled or disassembled, and is suitable for use in chemical experiments in which it is necessary for a catalyst, for example, to be exchanged frequently.

Figure 5:
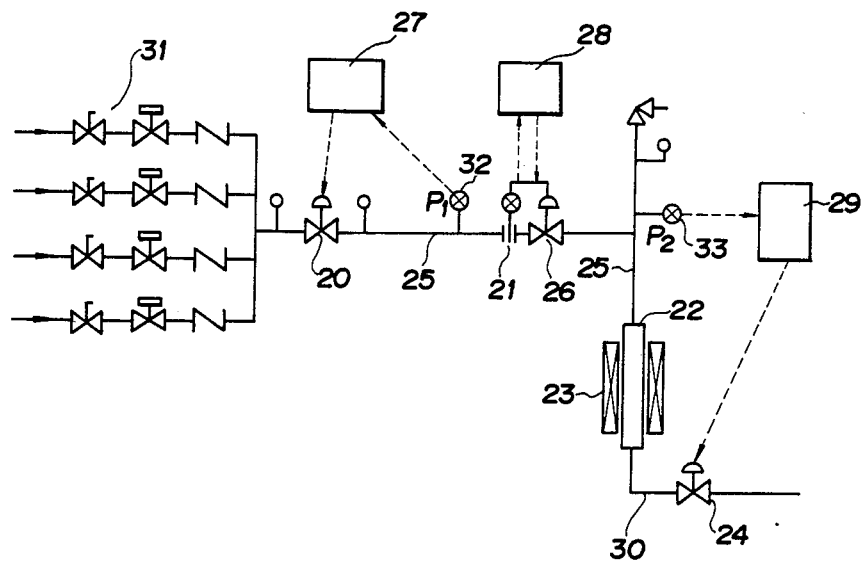
FIG. 5 is an illustrative diagram of a reaction system in which the reactor of the invention is included.

A system using the reactor of the invention in which the reaction pressure is automatically controlled will hereinafter be explained with reference to FIG. 5.

This system comprises:

an automatic control valve 20 provided in a feed introduction line 25;

flowmeter 21 with a control valve 26, which is provided in a feed introduction line 25 at the down stream side thereof relative to the automatic control valve 20;

an automatic pressure-controlling mechanism 27 adapted to control the automatic control valve 20 by measuring the pressure in the feed introduction line 25 between the automatic control valve 20 and the flowmeter 21 and producing a signal corresponding to a difference between the set pressure and the measured pressure;

an automatic flow rate-controlling mechanism 28 adapted to control the control valve 26 by measuring the flow rate by the flowmeter 21 and producing a signal corresponding to a difference between the set flow rate and the measured flow rate;

a flow type small-sized reactor 22, the inlet of the reactor 22 being connected to the feed introduction line 25 and the outlet being connected to a product withdrawal line 30;

an automatic back pressure valve 24 provided in the product withdrawal line 30; and an automatic back pressure-controlling mechanism 29 adapted to control the automatic back pressure valve 24 by measuring the pressure in the feed introduction line 25 at the down stream side thereof relative to the control valve 26 and producing a signal corresponding to a difference between the set pressure and the measured pressure.

In the reaction system as described above, the reaction pressure in the small-sized reactor 22 can be automatically controlled at a high speed and a high accuracy. Particularly, in a case in which the feed introduction amount is small, the reaction pressure can be controlled accurately and moreover automatically.

The pressure in the small-sized reactor 22 of the reaction system as described above can be controlled as follows:

The automatic control valve 20 is opened to maintain the difference between the pressure, $P_1$, in the feed introduction line 25 between the automatic control valve 20 and the flowmeter 21 and the pressure, $P_2$, in the feed introduction line 25 at the down stream side relative to the control valve 26 fitted to the flowmeter 21, i.e., $P_1-P_2$, at a suitable value (e.g., about 2 kg/cm$^2$). This suitable pressure difference means a pressure difference which is most preferred to make the flowmeter exhibit its performance. If the pressure difference between $P_1$ and $P_2$ is too large, the load exerted on the control valve 26 becomes too large and proper control can not be attained. On the other hand, if the pressure difference is too small, the feed does not flow smoothly. In this case, the flow rate is controlled by detecting the pressure $P_1$ by means of a pressure sensor, for example; converting the pressure $P_1$ into a voltage or current signal and inputting it to an electronic computer, etc.; comparing the pressure $P_1$ with the set pressure and producing a signal (e.g., a pulse) corresponding to the pressure difference; and running the driving mechanism (e.g., a step motor) of the automatic control valve 20 according to the signal. The foregoing mechanism in which a pressure sensor, an electronic computer, a signal generator (e.g., a pulse transmitter), and so forth are combined together and a series of processings from the detection of pressure to the calculation and further including the generation of signals is generally called herein an "automatic control mechanism". Hence, in accordance with the present invention, the pressure $P_1$ is adjusted by controlling the automatic control valve 20 by means of the automatic control mechanism 27.

The amount of the feed to be supplied to the small-sized reactor 22 through the feed introduction line 25 can be controlled by inputting the information from the flowmeter 21 to the automatic flow rate-controlling mechanism 28 wherein the calculation is performed and transmitting the signal from the mechanism 28 to the control valve 26, thereby opening or closing the control valve 26.

Figure 6:
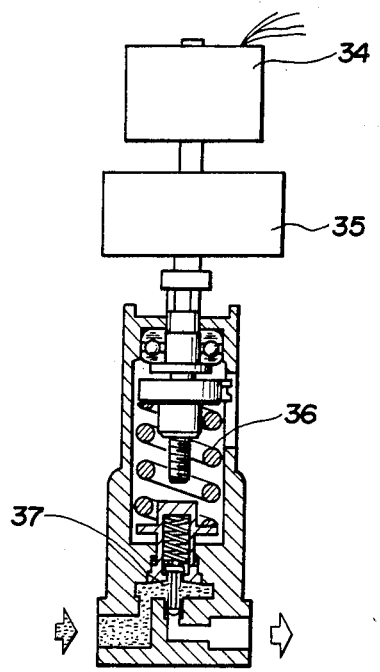
FIG. 6 is a schematic cross sectional view showing an embodiment of an automatic backpressure valve for use in the reaction system in which the reactor of the invention is included.

In order to enhance the pressure in the small-sized reactor 22, the pressure $P_2$ is converted into a current or voltage signal, and input it to the automatic back pressure-controlling mechanisms 29, and compared it with the pressure value previously set to produce a signal corresponding to the pressure difference, and the thus-produced signal is transmitted to run the driving mechanism of the automatic back pressure valve 24, thereby throttling the back pressure valve 24. For the production of the signal, a method may be employed in which a signal (e.g., number or intensity of pulse, current amount, voltage, and pneumatic pressure) of intensity varying in parallel to the difference between the set pressure and the measured pressure $P_2$ is produced at a time and the automatic back pressure valve 24 is throttled. However, as long as there is a difference between the set pressure and the measured pressure $P_2$, it is preferred to employ a method in which a signal of constant intensity is produced irrespective of the magnitude in the pressure difference, the automatic back pressure valve 24 is throttled by turning the automatic back pressure valve 24 by a predetermined angle and this operation is repeated to gradually throttle the automatic back pressure valve 24, thereby increasing the pressure. In this case, it is preferred that a series of automatic operations including the measurement of the pressure $P_2$, the production of a signal, and the operation of the automatic back pressure valve 24 be arranged to run for each given time, e.g., for each 2-4 seconds. It is also preferred that the driving mechanism (e.g., a step moter) to drive the automatic back pressure valve 24 be controlled to increase the pressure by 0.01-1 $kg/cm^2$ for each operation. An example of suitable automatic back pressure valves for such an operation is shown in FIG. 6.

As described above, when the automatic back pressure valve 24 is throttled, the pressure $P_2$ rises and simultaneously the flow rate in the feed introduction line 25 tends to drop. This decrease in the flow rate is input immediately from the flowmeter 2 to the automatic flow rate-controlling mechanism 28 where a signal is formed according to the difference in the measured flow rate and the set flow rate. The signal is then sent to the control valve 26 in order to loosen the valve. This results in an increase in the flow rate and the original flow rate is recovered quickly.

When the degree of opening of the control valve 26 is increased, the pressure difference between $P_1$ and $P_2$ is decreased. This results in a reduction in the pressure $P_1$. In the present invention, however, the information of the reduction in the pressure $P_1$ is immediately sent to the automatic pressure-controlling mechanism 27 where a signal is formed according to a difference between the set pressure and the measured pressure. The signal is sent to the automatic control valve 20 to open the valve, resulting in an increase in the pressure $P_1$. In the figure, the reference numeral 23 indicates a heating zone; 31, an inlet for feed introduction; 32, 33, pressure sensors; 34, a driving mechanism; 35, a reduction gear; 36, a spring; and 37, a main valve.

By controlling automatically and quickly each of the automatic back pressure valve 24, the control valve 26, and the automatic control valve 20, the pressure in the reactor 22 can be increased promptly to the desired level while maintaining the amount of the feed being supplied to the reactor 22 at a constant level.

In accordance with the reaction system as described above, the pressure in a small-sized reactor of the small flow rate system can be controlled automatically at a high speed and a high accuracy. Hence the reactor of the invention is suitable for use in chemical experiments for which reaction conditions are required to be set accurately.

What is claimed is:

1. A reactor comprising:
   an inner reaction tube having an inner space, open ends and a catalyst packed in the inner space;
   a head part for receiving said inner reactor tube and having an inlet opening for communication with one open end of said reaction tube, with a connection portion connected between said head part and said reaction tube for connecting said reaction tube to said head part, said head part having a further connection portion for connecting said head part to an outer cylindrical part; and
   an outer cylindrical part for receiving said head part and for connection to said head part by said further connection portion, said outer cylindrical part having a connecting portion including fastening means located on the outside surface of the upper end of the outer cylindrical part where said outer cylindrical part is connected to said head part by means disconnectably connected to said fastening means on the outer cylindrical part, said outer cylindrical part having a space therein accommodating said inner reaction tube, an inlet connection positioned for coupling to said inlet opening of said head part, said outer cylindrical part also having an outlet connection in communication with the other open end of said inner reaction tube whereby fluid can pass through said inlet connection through said inlet opening and into said one end of said reaction tube, through said catalyst in said reaction tube and out said other end of said reaction tube through said outlet connection;
   whereby said head part is disconnectably connected to said outer cylindrical part and the inner reaction tube placed in said outer cylindrical part so that said head part can be disconnected and removed along with said inner reaction tube from said outer cylindrical part without disturbing said inlet connection and said outlet connection.

2. A reactor according to claim 1, wherein said inlet connection of said outer cylindrical part extends into a side of said outer cylindrical part and said outlet of said outer cylindrical part extends downwardly through a lower portion of said cylindrical space, said fastening means on the outer cylindrical part comprising a thread, said further connecting portion of the head-part comprising a cap nut, said head part including a first groove defined at the top of said head part, and first packing in said first groove being engaged against an interior portion of said outer cylindrical part spaced above said inlet connection of said outer cylindrical part.

3. A reactor according to claim 2, wherein said head part includes a second groove spaced from said first groove and located on an opposite side of said inlet opening of said head part from said first groove, and second packing in said second groove engaged against a portion of said outer cylindrical part which is opposite from said inlet connection of said outer cylindrical part from said first packing.

4. A reactor comprising:
  an inner reaction tube having open ends and a catalyst packed therein;
  a head part having an inner space, an outer surface around said inner space, an inlet opening extending from said outer surface to said inner space, said inner reaction tube having an open end extending into said inner space and communicating with said inlet opening through said inner space;
  a connection packing engaged between said inner reaction tube and said head part, in said inner space for holding said inner reaction tube to said head part and for sealing said inner space;
  an outer cylindrical part having a connecting portion comprising fastening means located on the outside surface of the outer cylindrical part, the head part comprising means for disconnectably connecting it to said fastening means on the outer cylindrical part, the outer cylindrical part defining a further space therein to accommodate therein the inner reaction tube, an inlet connection spaced from the connecting portion, and an outlet connection for product from said further space, said inlet connection being between said outlet connection and said connecting portion of said outer cylindrical part; and
  a pair of spaced O-rings on said outer surface of said head part being located on opposite sides of said inlet opening and being engaged against said outer cylindrical part in said further space on opposite sides of said inlet connection, said connection packing and said O-rings being positioned to seal a pathway from said inlet connection to said inlet opening, through said inner space to said one open end of said inner tube;
  whereby the head part is disconnectably connected to the outer cylindrical part and the inner reaction tube placed in the further space of the outer cylindrical part is also connected to the head part so that the head part can be disconnected from the outer cylindrical part and the inner reaction tube removed without effecting the inlet connection and outlet connection of the outer cylindrical portion.

* * * * *